United States Patent
Akhoondi et al.

(10) Patent No.: US 11,218,834 B2
(45) Date of Patent: *Jan. 4, 2022

(54) SYSTEM TO TRACK VISITATION METRICS

(71) Applicant: Snap Inc., Santa Monica, CA (US)

(72) Inventors: Masoud Akhoondi, Los Angeles, CA (US); Yiwei Ma, Los Angeles, CA (US); Nima Khajehnouri, Los Angeles, CA (US); Rohan Monga, Culver City, CA (US); Shuo Wu, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/872,960

(22) Filed: May 12, 2020

(65) Prior Publication Data

US 2020/0275235 A1    Aug. 27, 2020

Related U.S. Application Data

(63) Continuation of application No. 15/664,509, filed on Jul. 31, 2017, now Pat. No. 10,735,890.

(51) Int. Cl.
| | |
|---|---|
| *H04W 24/00* | (2009.01) |
| *H04W 4/021* | (2018.01) |
| *H04L 29/08* | (2006.01) |
| *H04L 29/06* | (2006.01) |

(52) U.S. Cl.
CPC ............ *H04W 4/021* (2013.01); *H04L 67/22* (2013.01); *H04L 67/303* (2013.01); *H04L 65/1063* (2013.01)

(58) Field of Classification Search
CPC ......... H04W 4/02; H04W 4/14; H04W 48/04; H04W 64/00
See application file for complete search history.

(56) References Cited

U.S. PATENT DOCUMENTS

| | | |
|---|---|---|
| 9,529,634 B1 | 12/2016 | Hsu et al. |
| 2006/0100912 A1 | 5/2006 | Kumar et al. |
| 2009/0248533 A1 | 10/2009 | Colemen et al. |

(Continued)

OTHER PUBLICATIONS

"U.S. Appl. No. 15/664,509, Advisory Action dated Jun. 6, 2019", 3 pgs.

(Continued)

*Primary Examiner* — Matthew W Genack
(74) *Attorney, Agent, or Firm* — Schwegman Lundberg & Woessner, P.A.

(57) ABSTRACT

A visitation tracking system tracks user visitation to locations of interest to generate and report visualizations of the user visitation data. The visitation tracking system may be or include a group of one or more server machines configured to receive a user input specifying a location of interest, cause display of a presentation of a set of proximity borders within a region in response to the user input specifying the location of interest, wherein the region is based on the location of interest, receives a selection of a region to monitor (e.g., proximity borders, geo-fences), detects entries of client devices to a geo-fence represented by the region to monitor, and causes display of a notification in response to the detection of the entries.

20 Claims, 14 Drawing Sheets

(56) References Cited

U.S. PATENT DOCUMENTS

| | | | |
|---|---|---|---|
| 2010/0241714 A1* | 9/2010 | Aono | H04M 1/72436 |
| | | | 709/206 |
| 2013/0275221 A1* | 10/2013 | Zeto, III | G06Q 30/02 |
| | | | 705/14.58 |
| 2016/0104113 A1 | 4/2016 | Gorlin | |
| 2016/0364739 A1 | 12/2016 | Dann et al. | |
| 2017/0019446 A1 | 1/2017 | Son et al. | |
| 2017/0053158 A1 | 2/2017 | Kim et al. | |
| 2017/0129514 A1* | 5/2017 | Shubs, Jr. | B61L 27/04 |
| 2017/0150308 A1* | 5/2017 | Jones | H04W 4/021 |
| 2017/0193616 A1 | 7/2017 | Marshall et al. | |
| 2017/0238133 A1 | 8/2017 | Partheesh et al. | |
| 2017/0352043 A1* | 12/2017 | Tineo | H04W 4/021 |
| 2018/0189835 A1 | 7/2018 | Deluca et al. | |

OTHER PUBLICATIONS

"U.S. Appl. No. 15/664,509, Advisory Action dated Jun. 29, 2018", 3 pgs.

"U.S. Appl. No. 15/664,509, Examiner Interview Summary dated Jan. 24, 2018".

"U.S. Appl. No. 15/664,509, Examiner Interview Summary dated May 23, 2018", 3 pgs.

"U.S. Appl. No. 15/664,509, Final Office Action dated Mar. 18, 2019", 28 pgs.

"U.S. Appl. No. 15/664,509, Final Office Action dated May 2, 2018", 25 pgs.

"U.S. Appl. No. 15/664,509, Final Office Action dated Nov. 20, 2019", 32 pgs.

"U.S. Appl. No. 15/664,509, Non Final Office Action dated Jul. 2, 2019", 26 pgs.

"U.S. Appl. No. 15/664,509, Non Final Office Action dated Oct. 26, 2018", 27 pgs.

"U.S. Appl. No. 15/664,509, Non Final Office Action dated Dec. 28, 2017", 21 pgs.

"U.S. Appl. No. 15/664,509, Notice of Allowance dated Mar. 30, 2020", 8 pgs.

"U.S. Appl. No. 15/664,509, Response filed Jan. 14, 2020 to Final Office Action dated Nov. 20, 2019", 12 pgs.

"U.S. Appl. No. 15/664,509, Response Filed May 18, 2018 to Final Office Action dated May 2, 2018", 13 pgs.

"U.S. Appl. No. 15/664,509, Response filed May 20, 2019 to Final Office Action dated Mar. 18, 2019", 11 pgs.

"U.S. Appl. No. 15/664,509, Response filed Jan. 22, 2018 to Non Final Office Action dated Dec. 28, 2017", 15 pgs.

"U.S. Appl. No. 15/664,509, Response filed Oct. 28, 2019 to Non-Final Office Action dated Jul. 2, 2019", 12 pgs.

"U.S. Appl. No. 15/664,509, Response filed Nov. 28, 2018 to Non Final Office Action dated Oct. 26, 2018", 15 pgs.

* cited by examiner

1000

RECEIVE A SECOND USER INPUT SPECIFYING A PERIOD OF TIME
1002

TRACKING ENTRIES INTO THE GEOFENCE DURING THE PERIOD OF TIME
1004

SYSTEM TO TRACK VISITATION METRICS

CLAIM OF PRIORITY

This application is a continuation of U.S. patent application Ser. No. 15/664,509, filed on Jul. 31, 2017, which is incorporated herein by reference in its entirety.

TECHNICAL FIELD

Embodiments of the present disclosure relate generally to mobile computing technology and, more particularly, but not by way of limitation, to privacy sensitive systems for tracking visitation metrics.

BACKGROUND

Brick-and-mortar retailers often wish to collect data that describes usage and visitation patterns for various public and business locations. Such information can be extremely valuable in developing visitation statistics for various purposes, including for example, estimation of traffic on a given day or time, as well as identifying new markets or regions to expand.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
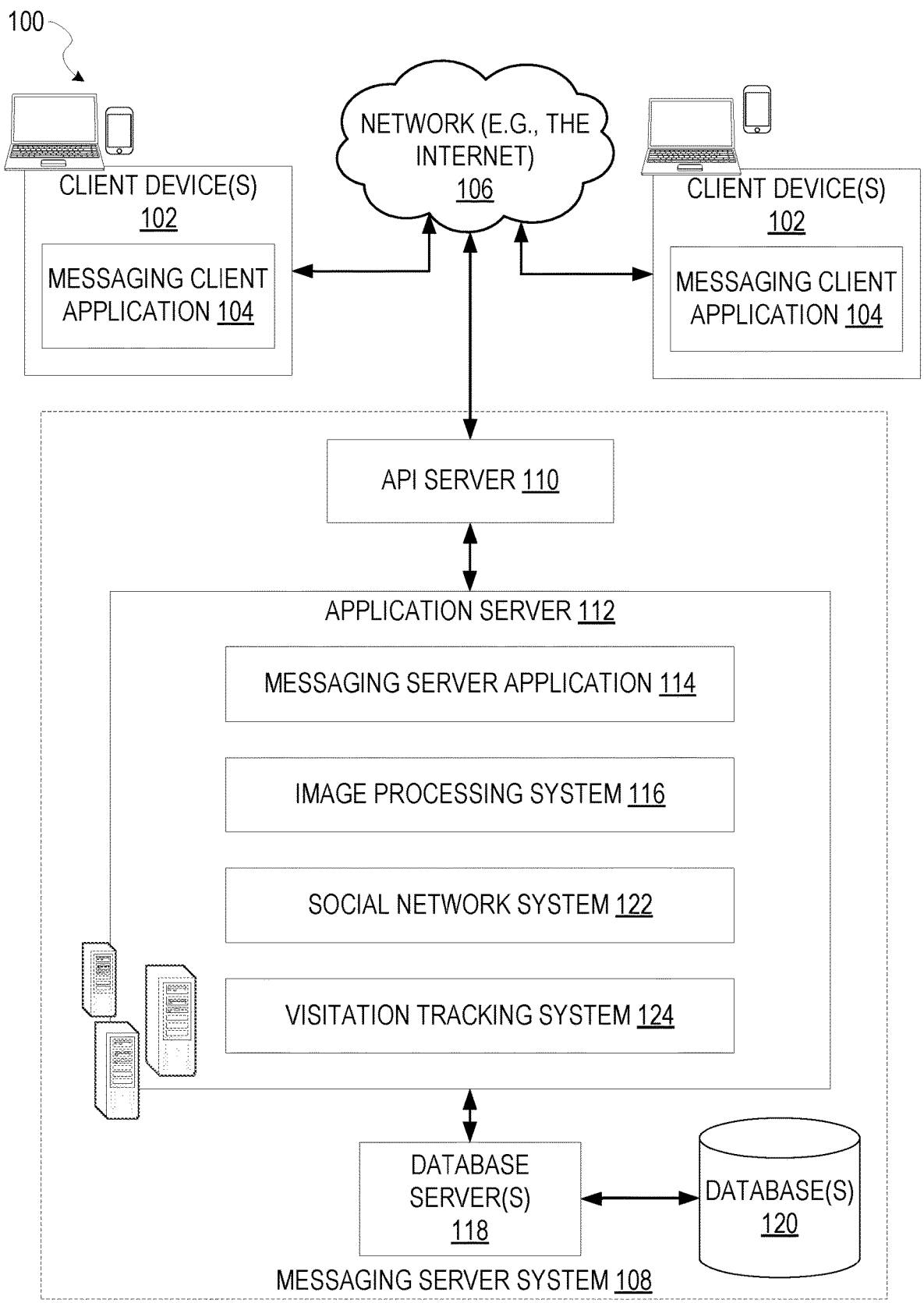
FIG. 1 is a block diagram showing an example messaging system for exchanging data (e.g., messages and associated content) over a network in accordance with some embodiments, wherein the messaging system includes an engagement tracking system.

Embodiments of the present disclosure relate generally to mobile computing technology and, more particularly, but not by way of limitation, to privacy sensitive systems for tracking visitation metrics. A visitation tracking system tracks user visitation to locations of interest to generate and report visualizations of the user visitation data. The visitation tracking system may include any instrumentality or aggregate of instrumentalities operable to compute, process, store, display, generate, communicate, or apply various forms of data for geo-fencing, control, or other purposes. For example, the visitation tracking system may be or include a group of one or more server machines configured to receive a user input specifying a location of interest, cause display of a presentation of a set of proximity borders representative of geo-fences, within a region in response to the user input specifying the location of interest, wherein the region is based on the location of interest, receives a selection of a region to monitor (e.g., proximity circles, geo-fences), detects entries of client devices to a geo-fence represented by the region to monitor, and causes display of a notification in response to the detection of the entries. The proximity borders may be in the shape of circles, squares, rectangles, or any other polygon or multi-polygon shape. For the purposes of explanation in the specification, and in some example embodiments, the proximity borders are referred to as "proximity circles," wherein the border of a geo-fence is circular in shape.

Geo-fencing is the practice of using location-aware devices (for example, but not limited to global positioning (GPS) or radio frequency identification (RFID)) to define a geographic boundary around a physical location. Once the "virtual barrier" of the geo-fence is established, an administrator of the geo-fence can set up triggers that cause display of notifications at one or more devices. For example, the notifications may include text messages, email alerts, push notifications, and the like. In some example embodiments, a proprietor associated with a region may generate and distribute location based media item with access conditions that include temporal as well as geolocation criteria, governed by a geo-fence. For example, the geo-fence may be configured to enable access to the media item in response to client devices transgressing the boundary of the geo-fence at predefined times. In this way, the proprietor may distribute incentives to a population of users that satisfy specific access conditions. Additionally, the location of a client device can be inferred based on access requests for location based media item associated with geo-fences.

In some example embodiments, the visitation tracking system may generate and cause display of a graphical user interface (GUI) that includes a map image representative of a location. A user may provide a user input specifying a location of interest through the GUI. For example, the user input may include an identification of a location of interest via an address, geo-location coordinates, or one or more identification criteria such as a business name. The user input may also include a selection of the location of interest through the map image depicted in the GUI. For example, a user may provide an input to the map image that identifies a location of the location of interest in the map image (e.g., via a cursor, by drawing an enclosed shape around the location of interest).

In response to the user input specifying the location of interest, the visitation tracking system may cause display of a presentation of depictions of a set of geo-fences. Each geo-fence among the set of geo-fences may encompass a portion of the region represented by the map image, wherein the portions are based on the user input specifying the location of interest. For example, the geo-fences may encompass portions of the region that are associated with, or otherwise related to the location of interest specified by the user input. In some example embodiments, the geo-fences may be represented as proximity borders that include proximity circles, wherein each proximity circle has a corresponding radius. In further embodiments, a user may specify a proximity circle and a maximum radius of the proximity circle. For example, the user may specify a specific proximity circle, and a maximum radius of the proximity circle to monitor. In response, the visitation tracking system configured the corresponding geo-fence associated with the proximity circle based on the maximum radius, such that the boundary of the geo-fence is based on the radius.

The visitation tracking system detects entry of a client device into the selected geo-fence(s), and in response, communicates a notification to a user. The notification may include a presentation of the geo-fence in which the entry occurred, as well as a time in which the entry occurred, as well as a presentation of user attributes of the user associated with the client device that entered the geo-fence. The user attributes may simply include a general representation of an age range (e.g., 18-32), and a gender of the user associated with the client device, with specific user identifiers omitted (e.g., username, etc.).

In some example embodiments, the visitation tracking system may track entries (i.e., visitation data) into the selected geo-fence over a predefined period of time, and generate visualizations of the visitation data. For example, the notification may include a visualization (e.g., a bar graph, line graph) that depicts entries into the geo-fence over a period of time. The visualizations may indicate a number of client devices that entered the geo-fence over a period of time, as well as a rate or frequency in which the client devices entered the geo-fenced area.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a location based measurement system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
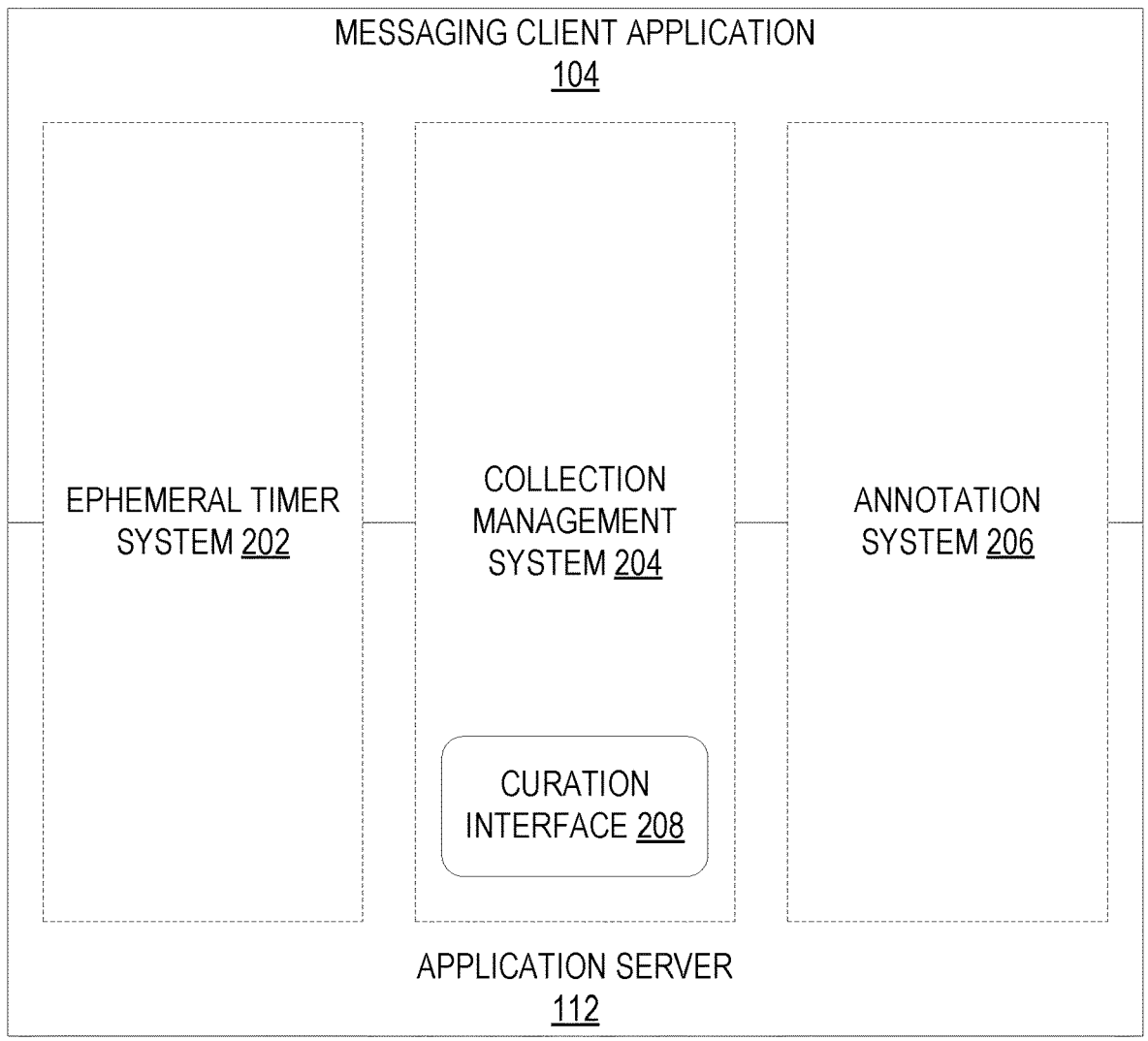
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
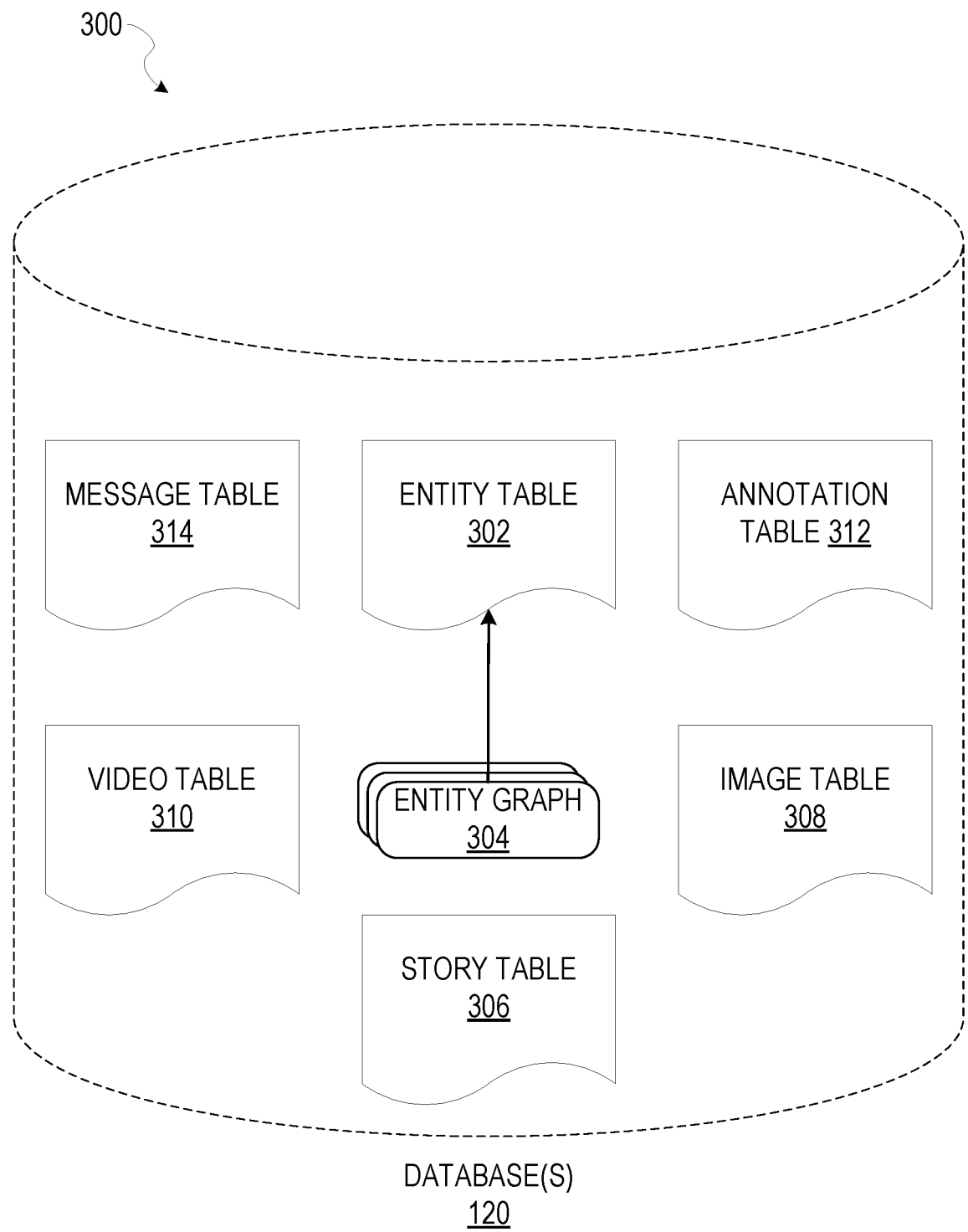
FIG. 3 is a schematic diagram illustrating data which may be stored in the database of the messaging server system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302) A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
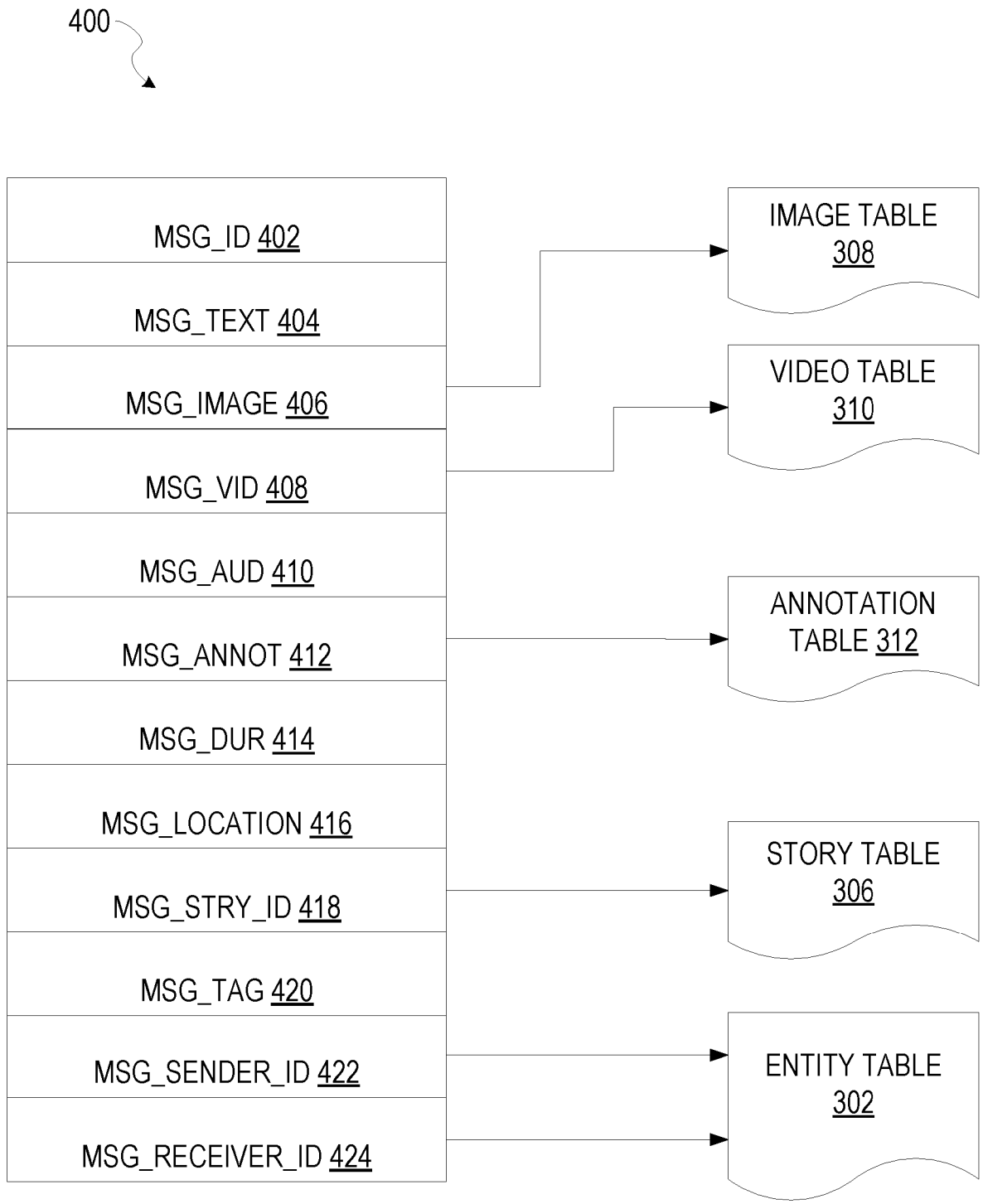
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from memory of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from the memory component of the client device 102, and that is included in the message 400.
- A message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address or device identifier) indicative of a user of the client device 102 on which the message 400 was generated and from which the message 400 was sent A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
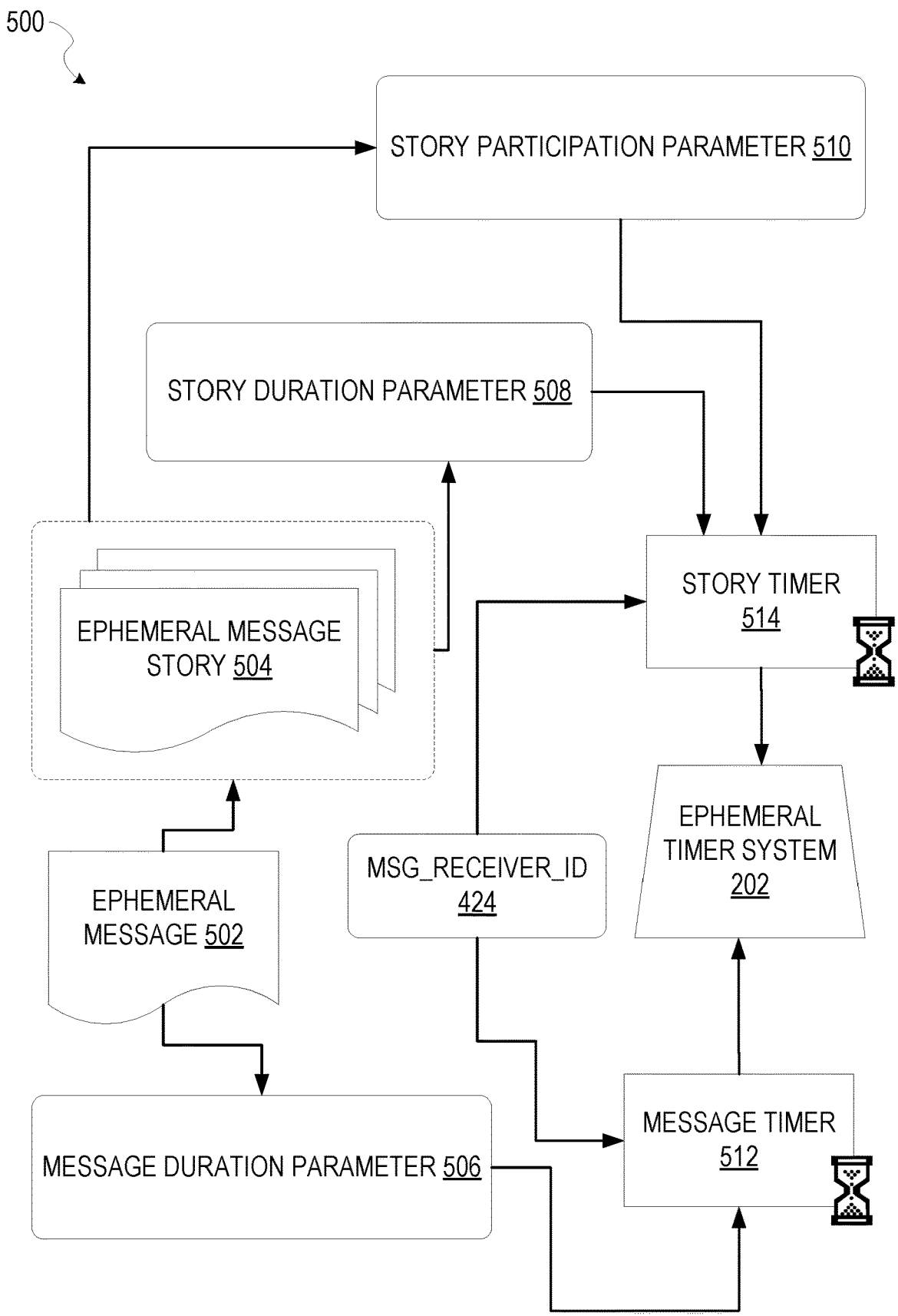
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral) in accordance with some embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104 to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
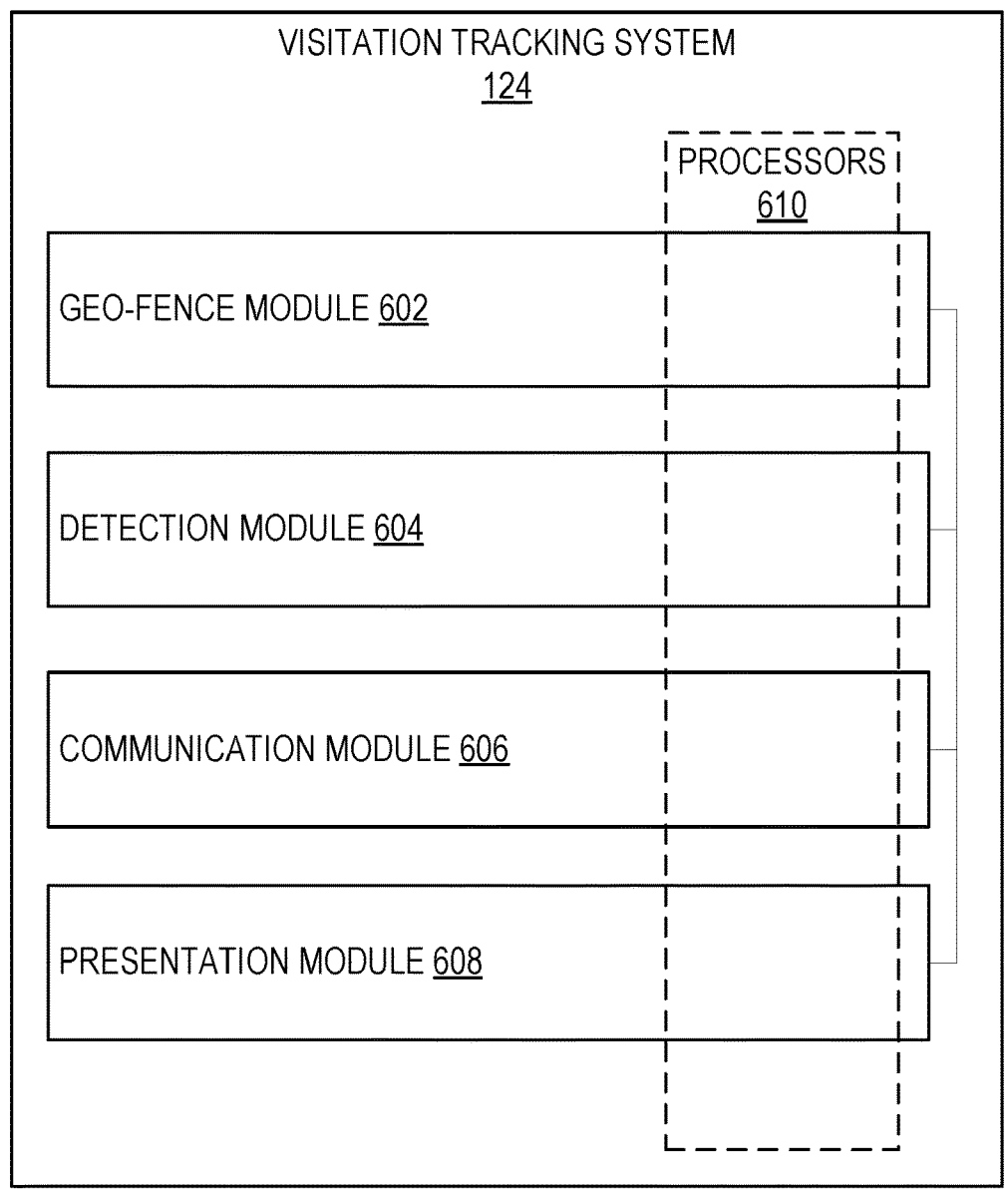
FIG. 6 is a block diagram illustrating various modules of a visitation tracking system, according to certain example embodiments.

FIG. 6 is a block diagram illustrating components of the visitation tracking system 124, that configure the visitation tracking system 124 to receive selection of location of interest, monitor geo-fences associated with the location of interest, detect entries into the geo-fences, and generate and cause display of notification in response to the entries, according to some example embodiments. The visitation tracking system 124 is shown as including a geo-fence module modules 602, an detection module 604, a communication module 606, and a presentation module 608, all configured to communicate with each other (e.g., via a bus, shared memory, or a switch). Any one or more of these modules may be implemented using one or more processors 610 (e.g., by configuring such one or more processors to perform functions described for that module) and hence may include one or more of the processors 610.

Any one or more of the modules described may be implemented using hardware alone (e.g., one or more of the processors 610 of a machine) or a combination of hardware and software. For example, any module described of the location based measurement system 124 may physically include an arrangement of one or more of the processors 610 (e.g., a subset of or among the one or more processors of the machine) configured to perform the operations described herein for that module. As another example, any module of the engagement tracking system 610 may include software, hardware, or both, that configure an arrangement of one or more processors 610 (e.g., among the one or more processors of the machine) to perform the operations described herein for that module. Accordingly, different modules of the engagement tracking system 610 may include and configure different arrangements of such processors 610 or a single arrangement of such processors 610 at different points in time. Moreover, any two or more modules of the location based measurement system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 7:
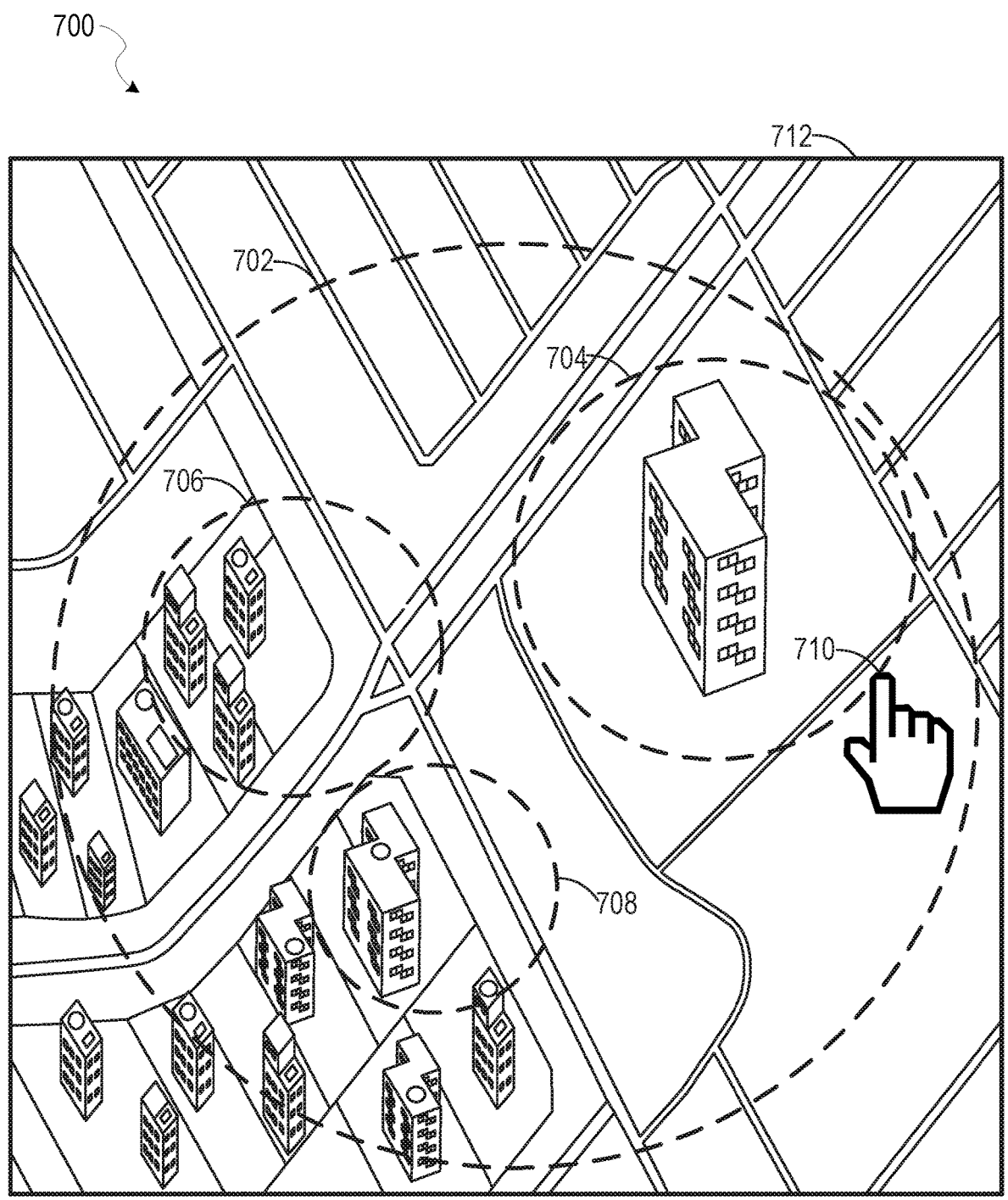
FIG. 7 is a diagram illustrating a presentation of a set of geo-fences by a visitation tracking system, according to certain example embodiments.

FIG. 7 is a diagram 700 illustrating a presentation of a set of proximity circles (e.g., proximity circles 702, 704, 706, 708), generated and presented in response to a user input specifying a location of interest, according to certain example embodiments. The set of proximity circles may each represent portions of the region depicted in the map image 712. A user may select one or more of the proximity circles based on a selection via a cursor 710.

For example, a user may provide a user input specifying a location of interest, and in response, the presentation module 608 generates and cause display of the presentation of the region 712, wherein the region 712 is based on the location of interest. For example, the user input specifying the location of interest may include an address or identifier that identifies a city (e.g., SANTA MONICA), a name of a business (e.g., JOE'S COFFEE), or an area (e.g., DOWNTOWN, ABBOTT KINNEY). In response to receiving the user input, the geo-fence module 602 retrieves a set of proximity circles that are related to the location of interest identified by the user input. The presentation module 608 generates and causes display of the proximity circles within the presentation of the region 712.

A user may select one or more of the proximity circles via a user input (e.g., selection via the cursor 710). In response, the detection module 604 monitors entries into the selected proximity circles in order to notify a user of the visitation data to the selected proximity circles.

Figure 8:
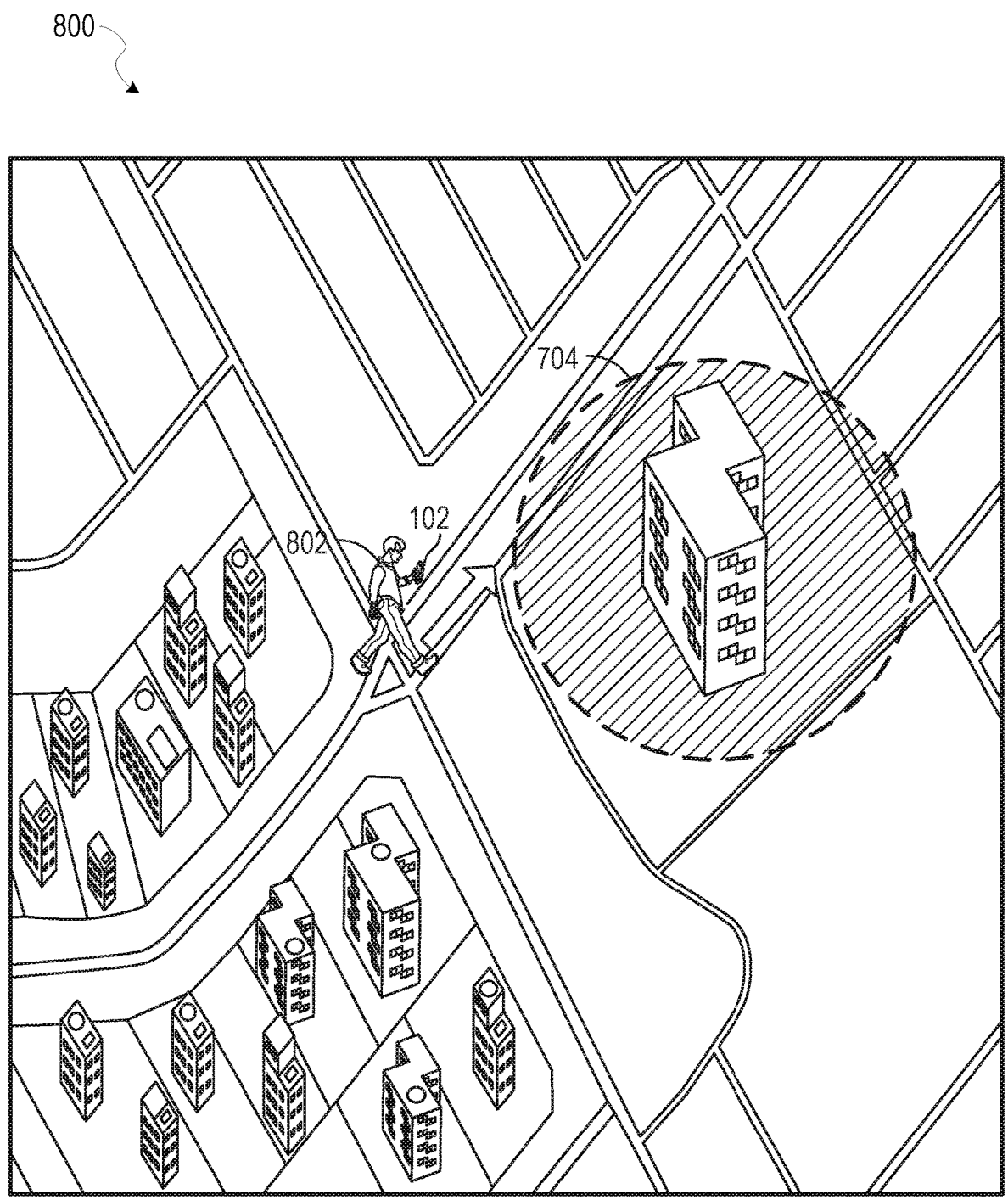
FIG. 8 is a diagram illustrating a geo-fence associated with a proximity circle from among the set of proximity circles, generated and maintained by a visitation tracking system, according to certain example embodiments.

FIG. 8 is a diagram 800 illustrating a user 802 with an associated client device 102, entering into the selected proximity circle 704 of FIG. 7. The detection module 604 may detect the user 802 entering into the geo-fence 704, and in response, cause the communication module 606 to generate and deliver a notification to another user (e.g., an administrator of the system).

Figure 9:
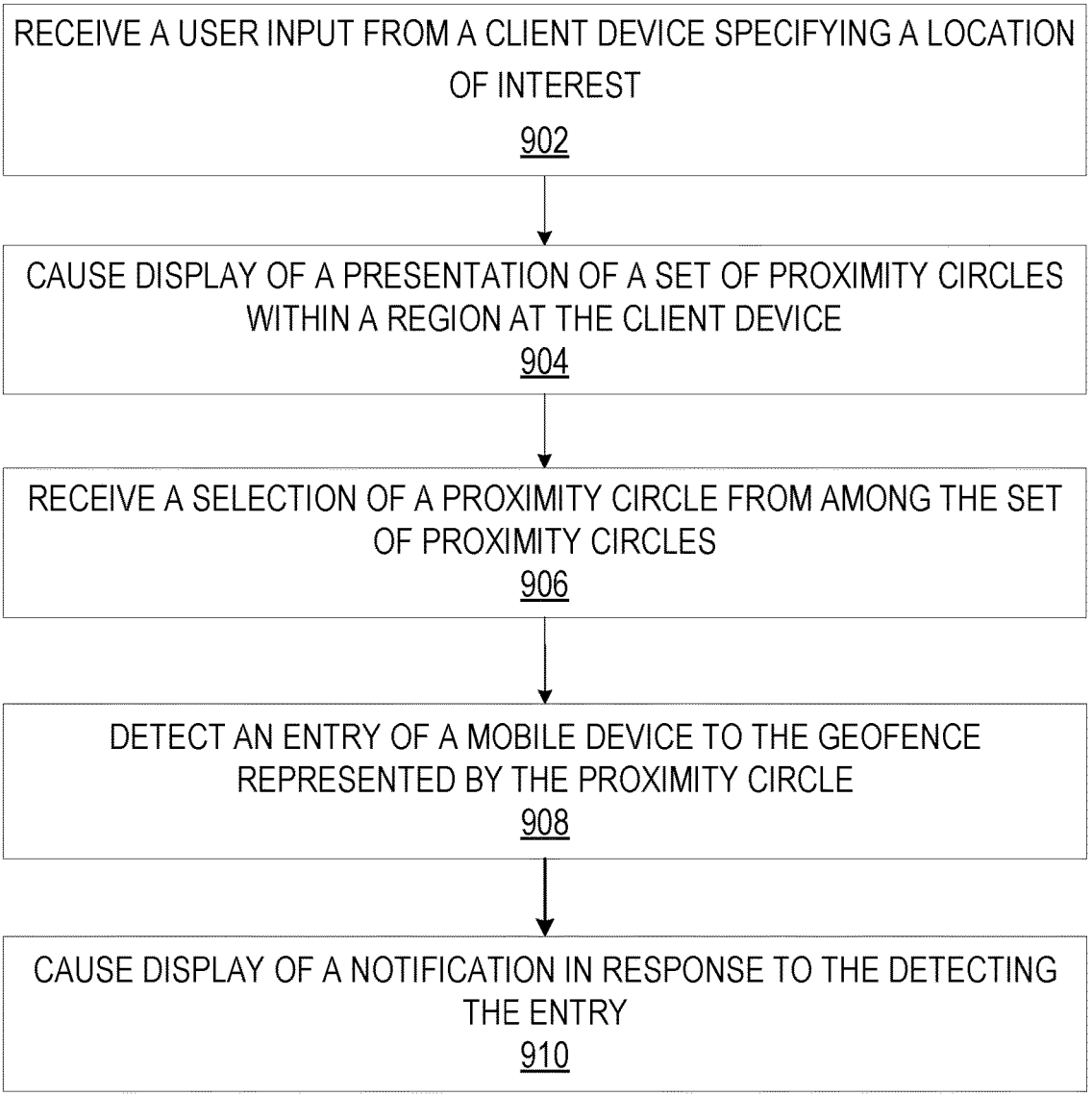
FIG. 9 is a flowchart illustrating operations of the visitation tracking system in performing a method for causing display of a notification in response to detecting a client device within a geo-fence, according to certain example embodiments.

FIG. 9 is a flowchart illustrating various operations of the visitation tracking system 124 in performing a method 900 for detecting entry of a client device into a geo-fence (e.g., as depicted in FIG. 8), and generating and causing display of a notification in response to the detection of the entry, according to certain example embodiments. Operations of the method 900 may be performed by the modules described above with respect to FIG. 6. As shown in FIG. 9, the method 900 includes one or more operations 902, 904, 906, 908, and 910.

At operation 902, the communications module 606 receives a user input specifying a location of interest through a GUI. The user input may include an identification of a location of interest via an address, geo-location coordinates, or one or more identification criteria such as a business name. For example, a user may provide a text input that identifies the location of interest through the GUI. In some example embodiments, the user input may also include a selection of the location of interest through a map image depicted in the GUI. For example, a user may provide an input to the map image that identifies a location of the location of interest in the map image (e.g., via a cursor, by drawing an enclosed shape around the location of interest).

At operation 904, the presentation module generates and causes display of a presentation of a set of geo-fences maintained by the geo-fence module 602, within a region associated with the location of interested identified by the user input. The set of geo-fences maintained by the geo-fence module 602 may be depicted as a set of closed shapes that encompass portions of the region. For example, the closes shapes may include proximity circles, wherein each proximity circles encompasses a portion of the region depicted in the GUI.

At operation 906, the communication module 606 receives a selection of one or more geo-fences from among the set of geo-fences depicted in the presentation. In some example embodiments, a user may specify a proximity circle by selecting the proximity circle with a cursor (e.g., cursor 710 of FIG. 7), and may further provide a user input specifying a dimension (e.g., maximum radius, circumference, square footage, acreage, volume) of the proximity circle (or proximity border). For example, the user may select a specific proximity circle, and a maximum radius of the proximity circle to monitor. In response, the geo-fence module 602 configures the selected geo-fence associated with the selected proximity circles based on the dimension, such that the boundary of the geo-fence is based on the specified dimension.

At operation 908, the detection module 604 detects an entry of a client device into the selected geo-fence. For example, as seen in FIG. 8, the detection module 604 detects the user 802 transgressing the boundary of the selected geo-fence 704. In response, at operation 910, the communication module 606 generates and delivers a notification to another user (e.g., an administrator of the system), wherein the notification includes an identifier of the geo-fence (e.g., an address), as well as temporal data indicating a time and date in which the entry into the geo-fence occurred.

Figure 10:
FIG. 10 is a flowchart illustrating operations of the visitation tracking system in performing a method for tracking entries into a geo-fence over a predefined period of time, according to certain example embodiments.
Figure 10:

FIG. 10 is a flowchart illustrating various operations of the visitation tracking system 124 in performing a method 1000 for tracking entries into a geo-fence over a predefined period of time, according to certain example embodiments. Operations of the method 1000 may be performed by the modules described above with respect to FIG. 6. As shown in FIG. 10, the method 1000 includes one or more operations 1002, and 1004. The method 1000 may be performed as a precursor or subroutine to operations of the method 900, as depicted in FIG. 9.

At operation 1002, the communication module 606 receives a second user input specifying a period of time. In some example embodiments, operation 1002 may occur as a precursor or subroutine to operation 906 of the method 900, as seen in FIG. 9. A user may provide a user input specifying a period of time in which the detection module 604 monitors the selected geo-fence. For example, the user may provide a user input specifying a day or date (e.g., Jul. 4, 2017, Independence Day, Halloween, etc.), or a period of time (e.g., 2:00 PM-5:00 PM, afternoon, morning, etc.). In response, at operation 1004, the detection module 604 monitors the selected geo-fence to collected visitation data for the duration of the specified day or period of time.

In some example embodiments, the visitation data tracked by the detection module 604 may include a number of entries into the selected geo-fence over the period of time, a rate in which the entries occurs, a time of when the first entry within the period of time occurs, as well as general user attribute data of client devices that enter into the selected geo-fence.

Figure 11:
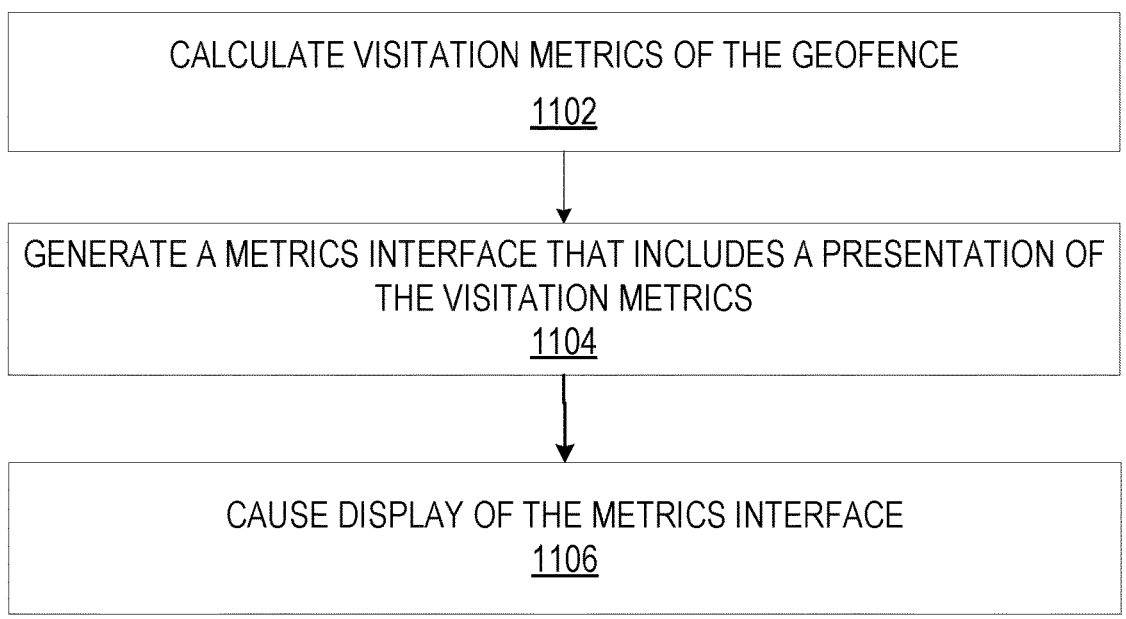
FIG. 11 is a flowchart illustrating operations of the visitation tracking system in performing a method for generating and causing display of a metrics interface, according to certain example embodiments.

FIG. 11 is a flowchart illustrating various operations of the visitation tracking system 124 in performing a method 1100 for generating and causing display of a metrics interface, according to certain example embodiments. Operations of the method 1100 may be performed by the modules described above with respect to FIG. 6. As shown in FIG. 11, the method 1100 includes one or more operations 1102, 1104, and 1106. The method 1100 may be performed as a precursor or subroutine to operations of the method 900 and 1000, as depicted in FIGS. 9 and 10.

At operation 1102, the detection module 604 calculates visitation metrics of the selected geo-fence, based on the visitation data. For example, the visitation metrics may include a frequency in which client devices enter into the selected geo-fence, as well as a breakdown of attributes associated with the client devices that entered into the selected geo-fence. For example, the visitation metrics may indicate a total number of client devices that entered the selected geo-fence during the specified time period, as well as a number of client devices associated with users with various user attributes (e.g., age 18-32, male, female, etc.).

At operation 1104, the presentation module 608 generates a metrics interface that includes a presentation of the visitation metrics. The presentation of the visitation metrics may include a bar graph, a line graph, and a pie chart. In some example embodiments, the metrics interface may include one or more menus containing user selectable options, wherein a user may alter the presentation of the visitation metrics based on a selection of one or more user selectable options. The user may select to display metrics associated with all client devices associated with users of a specific age or gender, as well as a specific time frame (i.e., within the specified time frame). For example, the user may opt to display a rate in which users of a specific age range entered the selected geo-fence.

At operation 1106, the presentation module 608 causes display of the metrics interface that includes the presentation of the visitation metrics. In some example embodiments, the presentation may be based upon the user selections.

Figure 12:
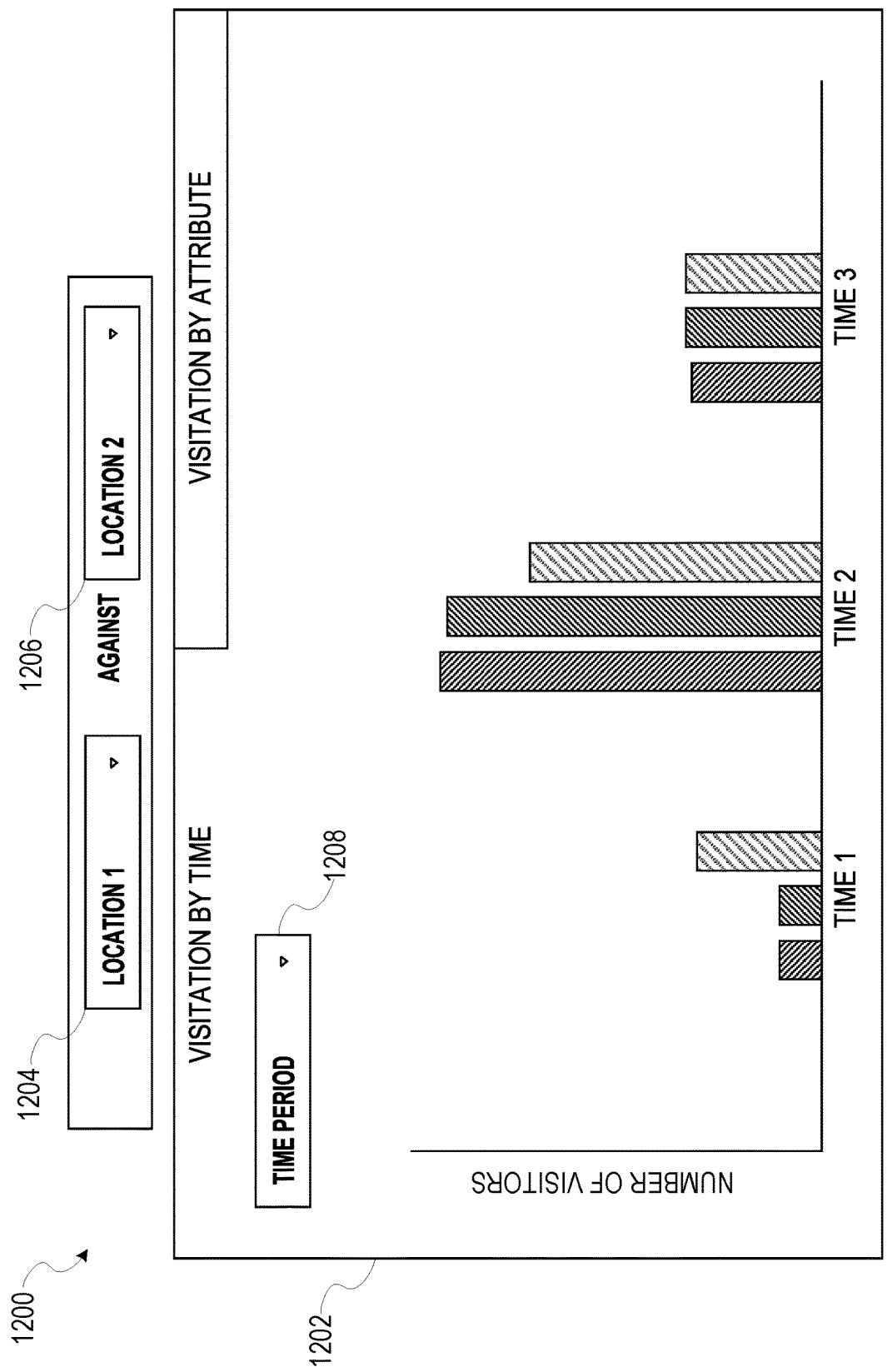
FIG. 12 is a diagram illustrating a metrics interface generated by the visitation tracking system, according to certain example embodiments.

FIG. 12 is a depiction of a metrics interface 1200, generated by the visitation tracking system 124, according to certain example embodiments. As shown in FIG. 12, the metrics interface 1200 includes a visualization of visitation metrics 1202, as well as a set of user selectable options 1204, 1206, and 1208.

The metrics interface 1200 may be generated by the presentation module 608, according to the operations of the method 1100 discussed above. A user viewing the metrics interface 1200 may provide inputs to one or more of the user selectable options 1204, 1206, and 1208, in order to alter or adjust the presentation of the visitation metrics 1202.

As seen in FIG. 12, the presentation of the visitation metrics 1202 may be configured to display a number of visitors to a location by time. For example, as seen in FIG. 12, the largest number of users that visited the location occurred at "TIME 2."

Software Architecture

Figure 13:
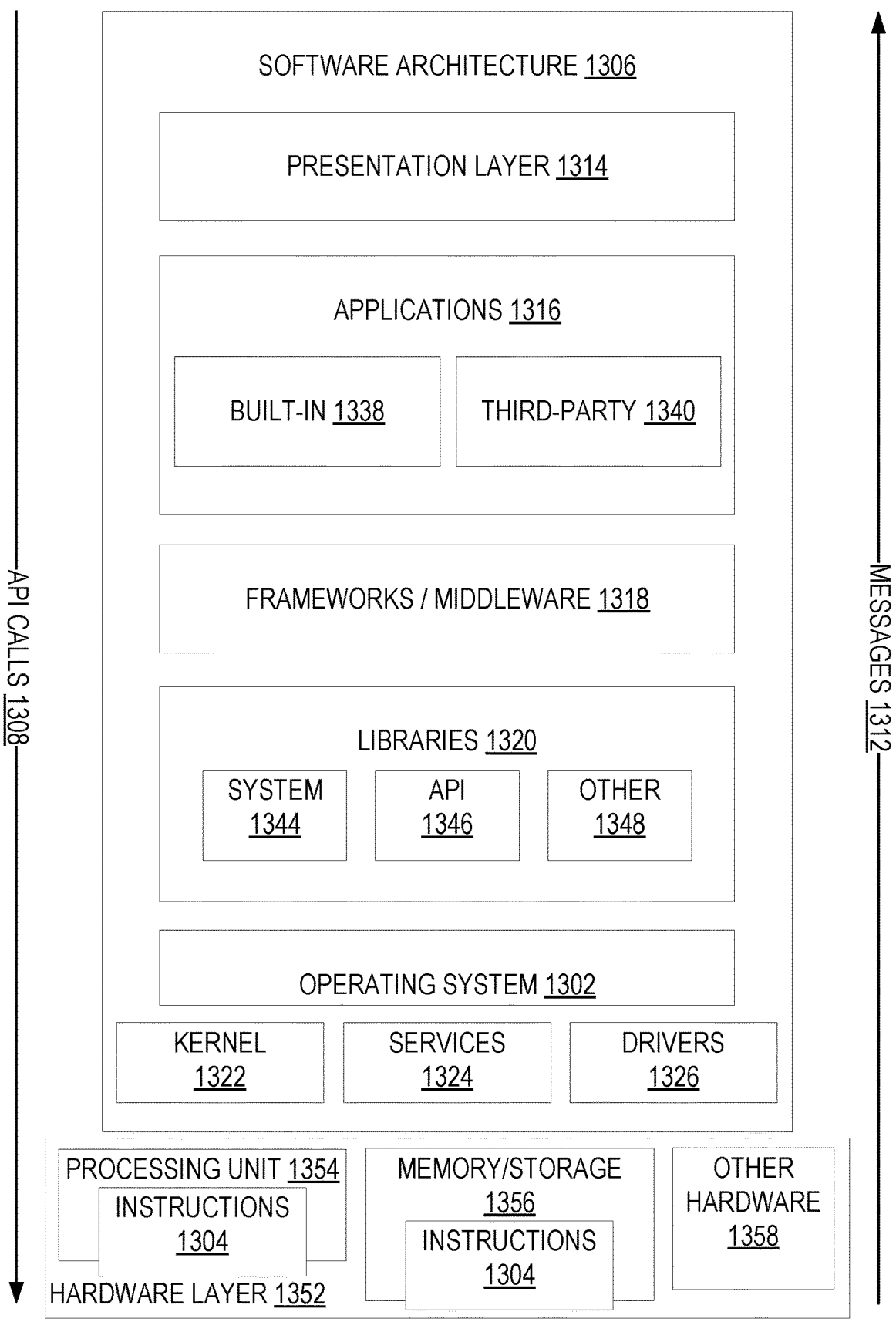
FIG. 13 is a block diagram illustrating a representative software architecture, which may be used in conjunction with various hardware architectures herein described and used to implement various embodiments.

FIG. 13 is a block diagram illustrating an example software architecture 1306, which may be used in conjunction with various hardware architectures herein described. FIG. 13 is a non-limiting example of a software architecture and it will be appreciated that many other architectures may be implemented to facilitate the functionality described herein. The software architecture 1306 may execute on hardware such as machine 1400 of FIG. 14 that includes, among other things, processors 1434, memory 1414, and I/O components 1418. A representative hardware layer 1352 is illustrated and can represent, for example, the machine 1400 of FIG. 41. The representative hardware layer 1352 includes a processing unit 1354 having associated executable instructions 1304. Executable instructions 1304 represent the executable instructions of the software architecture 1306, including implementation of the methods, components and so forth described herein. The hardware layer 1352 also includes memory and/or storage modules memory/storage 1356, which also have executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, applications 1316 and a presentation layer 1314. Operationally, the applications 1316 and/or other components within the layers may invoke application programming interface (API) API calls 1308 through the software stack and receive a response as in response to the API calls 1008. The layers illustrated are representative in nature and not all software architectures have all layers. For example, some mobile or special purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324 and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than to interface directly with the underlying operating system 1302 functionality (e.g., kernel 1322, services 1324 and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 (also sometimes referred to as middleware) provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. Third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as operating system 1302) to facilitate functionality described herein.

The applications 1316 may use built in operating system functions (e.g., kernel 1322, services 1324 and/or drivers 1326), libraries 1320, and frameworks/middleware 1318 to create user interfaces to interact with users of the system. Alternatively, or additionally, in some systems interactions with a user may occur through a presentation layer, such as presentation layer 1314. In these systems, the application/component "logic" can be separated from the aspects of the application/component that interact with a user.

Figure 14:
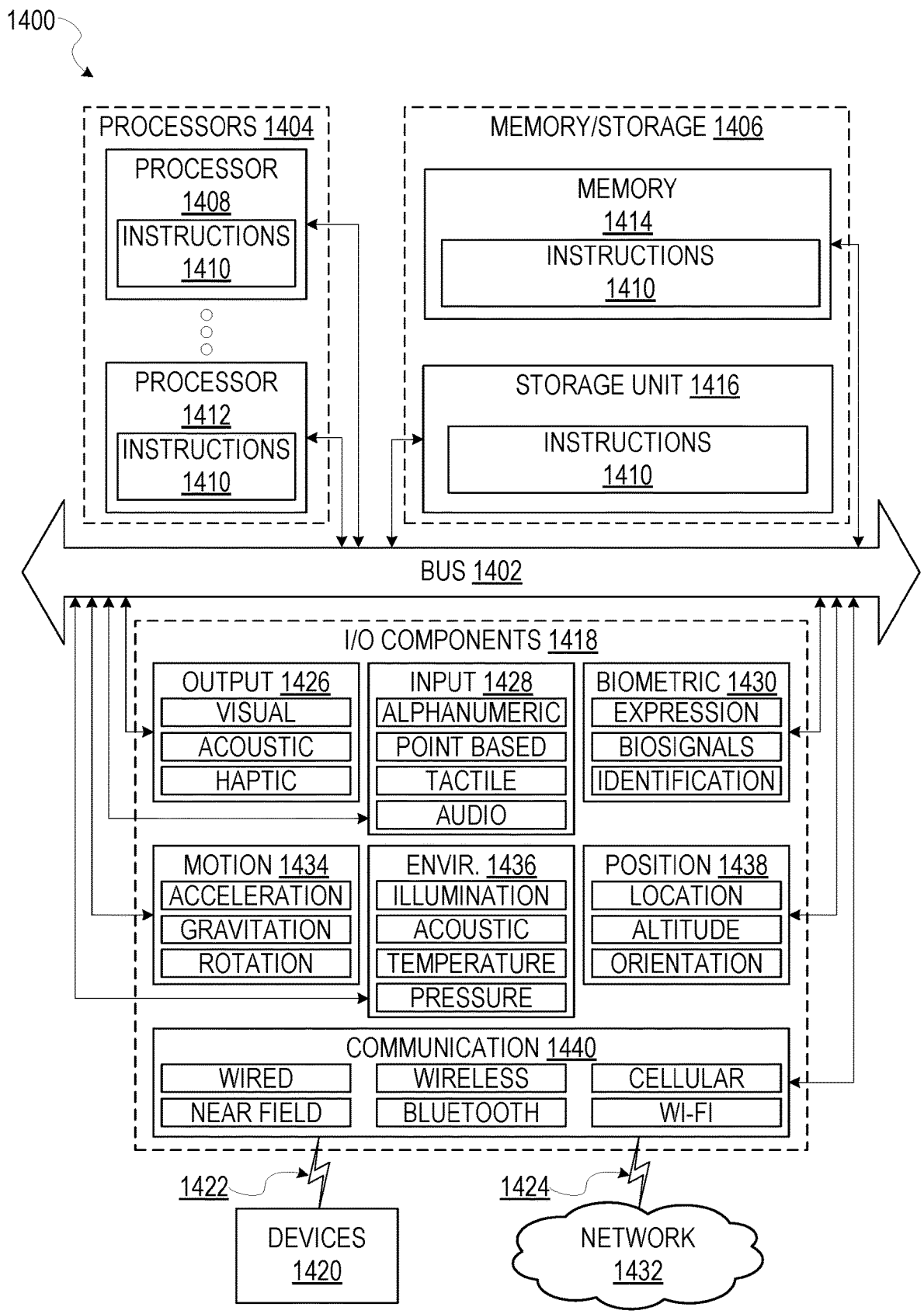
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory memory/storage 1406, and I/O components 1418, which may be configured to communicate with each other such as via a bus 1402. The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of processors 1404 are examples of machine-readable media.

The I/O components 1418 may include a wide variety of components to receive input, provide output, produce output, transmit information, exchange information, capture measurements, and so on. The specific I/O components 1418 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1418 may include many other components that are not shown in FIG. 14. The I/O components 1418 are grouped according to functionality merely for simplifying the following discussion and the grouping is in no way limiting. In various example embodiments, the I/O components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1418 may include biometric components 1430, motion components 1434, environmental environment components 1436, or position components 1438 among a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1434 may include acceleration sensor components (e.g., accelerometer), gravitation sensor components, rotation sensor components (e.g., gyroscope), and so forth. The environment components 1436 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via coupling 1422 and coupling 1424 respectively. For example, the communication components 1440 may include a network interface component or other suitable device to interface with the network 1432. In further examples, communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a Universal Serial Bus (USB)).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

What is claimed is:

1. A method comprising:
receiving, at a client device, an identifier that corresponds with a region that includes a location of interest;
causing display of a presentation of a map image that depicts the region that includes the location of interest identified by the identifier;
receiving, from a client device, a first input that draws a boundary around the location of interest upon the presentation of the map image;
causing display of a presentation of one or more geo-fences located within the boundary defined by the first input in response to the user input that draws the boundary around the location of interest;
receiving, from the client device, a second input that selects a display of a geo-fence from among the presentation of the one or more geo-fences;
detecting an entry into the geo-fence; and
causing display of a notification at the client device in response to the detecting the entry into the geo-fence based on the input that selects the display of the geo-fence.

2. The method of claim 1, wherein the client device is a first client device, the detecting the entry into the geo-fence includes detecting a second client device within the geo-fence, and wherein the notification includes an indication of a set of user attributes associated with the second client device.

3. The method of claim 1, wherein the identifier includes an address that identifies the location of interest.

4. The method of claim 1, wherein the notification includes the identifier that identifies the location of interest.

5. The method of claim 1, wherein the entry comprises entry attributes, and wherein the notification includes a display of the entry attributes.

6. The method of claim 5, wherein the entry attributes include a time of the entry.

7. The method of claim 1, wherein the detecting the entry into the geo-fence includes:
detecting the entry into the geo-fence during a temporal period;
determining a total number of entries into the geo-fence during the temporal period based on the entry into the geo-fence; and
wherein the notification includes a display of the total number of entries into the geo-fence during the temporal period.

8. A system comprising:
a memory; and
at least one hardware processor coupled to the memory and comprising instructions that causes the system to perform operations comprising:
receiving, at a client device, an identifier that corresponds with a region that includes a location of interest;
causing display of a presentation of a map image that depicts the region that includes the location of interest identified by the identifier;

receiving, from a client device, a first input that draws a boundary around the location of interest upon the presentation of the map image;

causing display of a presentation of one or more geo-fences located within the boundary defined by the first input in response to the user input that draws the boundary around the location of interest;

receiving, from the client device, a second input that selects a display of a geo-fence from among the presentation of the one or more geo-fences;

detecting an entry into the geo-fence; and causing display of a notification at the client device in response to the detecting the entry into the geo-fence based on the input that selects the display of the geo-fence.

9. The system of claim 8, wherein the client device is a first client device, the detecting the entry into the geo-fence includes detecting a second client device within the geo-fence, and wherein the notification includes an indication of a set of user attributes associated with the second client device.

10. The system of claim 8, wherein the identifier includes an address that identifies the location of interest.

11. The system of claim 8, wherein the notification includes the identifier that identifies the location of interest.

12. The system of claim 8, wherein the entry comprises entry attributes, and wherein the notification includes a display of the entry attributes.

13. The system of claim 12, wherein the entry attributes include a time of the entry.

14. The system of claim 8, wherein the detecting the entry into the geo-fence includes:
 detecting the entry into the geo-fence during a temporal period;
 determining a total number of entries into the geo-fence during the temporal period based on the entry into the geo-fence; and
 wherein the notification includes a display of the total number of entries into the geo-fence during the temporal period.

15. A non-transitory machine-readable storage medium comprising instructions that, when executed by one or more processors of a machine, cause the machine to perform operations comprising:
 receiving, at a client device, an identifier that corresponds with a region that includes a location of interest;
 causing display of a presentation of a map image that depicts the region that includes the location of interest identified by the identifier;
 receiving, from a client device, a first input that draws a boundary around the location of interest upon the presentation of the map image;
 causing display of a presentation of one or more geo-fences located within the boundary defined by the first input in response to the user input that draws the boundary around the location of interest;
 receiving, from the client device, a second input that selects a display of a geo-fence from among the presentation of the one or more geo-fences;
 detecting an entry into the geo-fence; and
 causing display of a notification at the client device in response to the detecting the entry into the geo-fence based on the input that selects the display of the geo-fence.

16. The non-transitory machine-readable storage medium of claim 15, wherein the client device is a first client device, the detecting the entry into the geo-fence includes detecting a second client device within the geo-fence, and wherein the notification includes an indication of a set of user attributes associated with the second client device.

17. The non-transitory machine-readable storage medium of claim 15, wherein the identifier includes an address that identifies the location of interest.

18. The non-transitory machine-readable storage medium of claim 15, wherein the notification includes the identifier that identifies the location of interest.

19. The non-transitory machine-readable storage medium of claim 15, wherein the entry comprises entry attributes, and wherein the notification includes a display of the entry attributes.

20. The non-transitory machine-readable storage medium of claim 15, wherein the detecting the entry into the geo-fence includes:
 detecting the entry into the geo-fence during a temporal period;
 determining a total number of entries into the geo-fence during the temporal period based on the entry into the geo-fence; and
 wherein the notification includes a display of the total number of entries into the geo-fence during the temporal period.

* * * * *